(12) United States Patent
Stevanovic et al.

(10) Patent No.: US 9,614,950 B1
(45) Date of Patent: Apr. 4, 2017

(54) DETERMINING A PRIORITIZED LIST OF TELEPHONE NUMBERS FOR A SPECIFIC USER

(71) Applicant: GM GLOBAL TECHNOLOGY OPERATIONS LLC, Detroit, MI (US)

(72) Inventors: Miroslav Stevanovic, Concord (CA);
Hassan Elnajjar, Dearborn, MI (US);
Neeraj R. Gautama, Whitby (CA);
Opeyemi Adesina, Ottawa (CA);
Vahdat Abdelzad, Ottawa (CA)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/961,816

(22) Filed: Dec. 7, 2015

(51) Int. Cl.
*H04M 3/00* (2006.01)
*H04M 1/725* (2006.01)
*H04L 29/08* (2006.01)

(52) U.S. Cl.
CPC ........ *H04M 1/72527* (2013.01); *H04L 67/12* (2013.01); *H04L 67/30* (2013.01)

(58) Field of Classification Search
CPC ..... H04W 8/245; H04W 24/02; H04W 88/02; H04M 1/72525; H04M 1/72522; H04M 1/6075; H04M 1/72527; H04M 1/7253; H04M 1/725; B06R 11/0241; B06R 2011/0005; B06R 2011/0071; H04B 1/3877
USPC ................... 455/418–420, 550.1, 557, 575.9
See application file for complete search history.

(56) References Cited

U.S. PATENT DOCUMENTS

| | | | |
|---|---|---|---|
| 6,704,398 B2 | 3/2004 | Tsuchiyama | |
| 7,035,393 B1 | 4/2006 | Silver et al. | |
| 8,010,136 B2 * | 8/2011 | MacDonald | H04L 12/5855 455/422.1 |
| 8,254,900 B2 * | 8/2012 | Azuma | H04M 1/6091 455/418 |
| 8,750,899 B2 * | 6/2014 | Lowell | H04W 24/08 455/456.1 |
| 9,020,491 B2 * | 4/2015 | Ricci | G06F 9/54 455/420 |
| 2002/0064263 A1 | 5/2002 | McBrearty et al. | |
| 2002/0151334 A1 | 10/2002 | Sharma | |
| 2004/0192270 A1 | 9/2004 | Kreitzer | |
| 2008/0242315 A1 * | 10/2008 | Ferman | G08G 1/0104 455/456.2 |

(Continued)

*Primary Examiner* — Nhan Le
(74) *Attorney, Agent, or Firm* — Dierker & Kavanaugh, P.C.

(57) ABSTRACT

An application is automatically launched in response to identifying a specific user in the vehicle. Upon launching the application, a historical calling profile is automatically downloaded for the user. The historical calling profile includes individual vehicle call records. The historical calling profile is updated with vehicle call record(s) corresponding to each instance of an outgoing call placed while the user is in the vehicle. A probability of a telephone number being chosen for an outgoing call, within time increments while the user is in the vehicle or in response to a request, is dynamically determined. The probability is dependent upon location data points retrieved from the individual vehicle call records. A list of telephone numbers sorted by the probability is dynamically generated. A most recently generated list of telephone numbers sorted by the probability is caused to be displayed on a vehicle display while the user is in the vehicle.

8 Claims, 2 Drawing Sheets

(56) References Cited

U.S. PATENT DOCUMENTS

2013/0203400 A1* 8/2013 Ricci ................ H04W 4/046
                                                    455/418

* cited by examiner

US 9,614,950 B1

DETERMINING A PRIORITIZED LIST OF TELEPHONE NUMBERS FOR A SPECIFIC USER

TECHNICAL FIELD

The present disclosure relates generally to determining a prioritized list of telephone numbers for a specific user.

BACKGROUND

Vehicles are often equipped with in-vehicle communications platforms (e.g., telematics unit and/or infotainment units) or other in-vehicle controllers that enable hands free calling, vehicle tracking, navigation instruction transmission, and other like features. For hands free calling, the in-vehicle communications platform may be wirelessly connected to a paired mobile communications device. Incoming calls to the mobile communications device may be received through the vehicle's audio system, enabling the driver to take phone calls without having to engage the mobile communications device. In some instances, the phonebook stored on the mobile communications device may also be accessible to the driver, for example, on an in-vehicle display.

SUMMARY

In an example of a method for determining a prioritized list of telephone numbers for a specific user, an in-vehicle call log application is automatically launched in response to identifying the specific user in the vehicle. Upon launching the application, a historical calling profile is automatically downloaded for the user. The historical calling profile includes individual vehicle call records. The historical calling profile is updated with a vehicle call record corresponding to each instance of an outgoing call placed while the user is in the vehicle. A probability of a telephone number being chosen for an outgoing call within respective predetermined time increments while the user is in the vehicle is dynamically determined. The probability is dependent upon location data points retrieved from the individual vehicle call records. A list of telephone numbers sorted by the probability is dynamically generated. A most recently generated list of telephone numbers sorted by the probability is caused to be displayed on a vehicle display while the user is in the vehicle.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Examples of the system and method disclosed herein utilize a specific user's historical calling profile to dynamically predict a list of telephone numbers that are likely to be selected for an outgoing call within predetermined time increments while the specific user is in any vehicle. The historical calling profile includes individual vehicle call records, where each call record includes data associated with an outgoing call made by the specific user while he/she was in a vehicle. An in-vehicle call log application collects the data during the outgoing call, such as vehicle location data point(s) during the call, time/date data point(s) of the call, and a subject telephone number of the outgoing call. This data is stored in the historical calling profile. During a subsequent vehicle trip, the specific user is recognized within the vehicle and his/her profile is downloaded to the vehicle. During this trip (and while the user is in the vehicle), the historical calling profile is updated when the user makes an outgoing call. Also during this trip, the user is provided with a most recently generated predicted list of telephone numbers that are probable candidates for outgoing calls at the particular time(s) that the user is in the vehicle. The predicted list of telephone numbers may be generated in response to a request from the user, or may be routinely updated while the user is in the vehicle.

Providing the specific user with an updated predicted list of telephone numbers that are probable candidates for outgoing calls enables the user to select an outgoing telephone number on the in-vehicle display without having to scroll through a phonebook.

As will be illustrated in the Example section disclosed herein, it has been found that the inclusion of the vehicle location data in the vehicle call records improves the accuracy of the predictions that are made, and thus improves the technological process of providing personalized in-vehicle services. The historical data may depict a pattern in which the specific user calls a particular telephone number from a particular vehicle location. As such, the inclusion of location data when determining the probability that a telephone number will be chosen increases the accuracy of the results.

Figure 1:
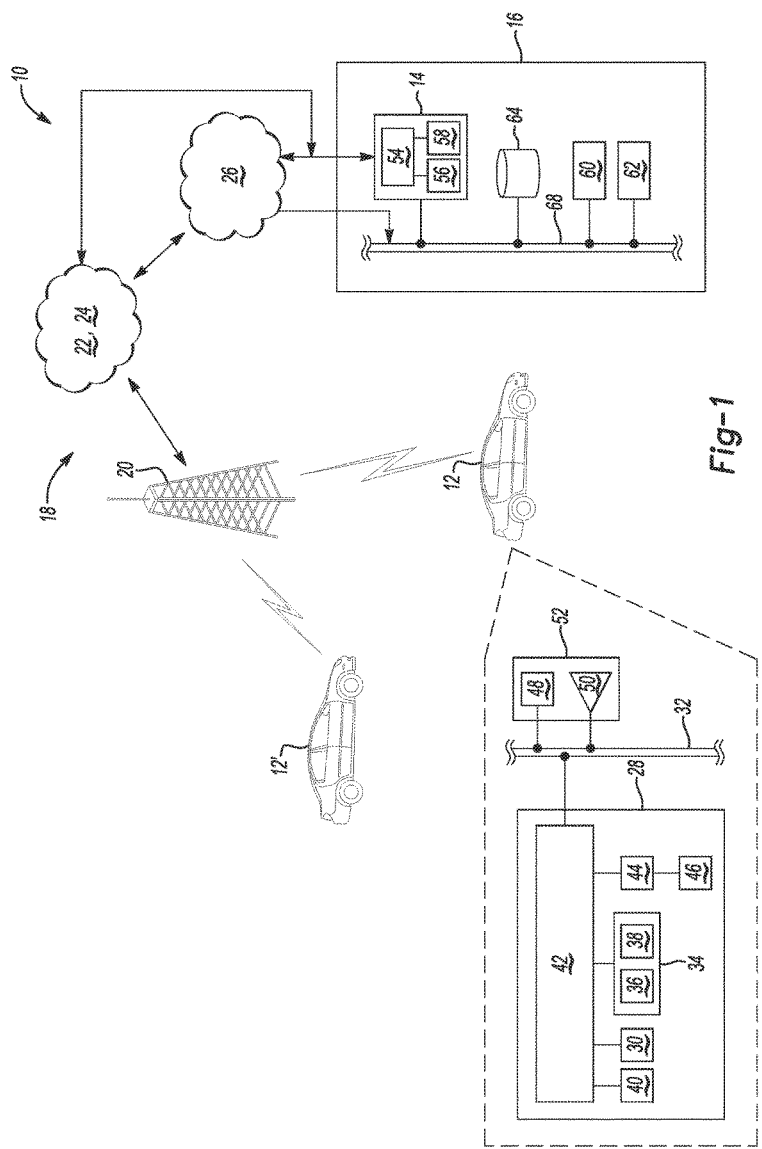
FIG. 1 is a schematic view of an example of a system for determining a prioritized list of telephone numbers for a specific user.

Referring now to FIG. 1, an example of a system 10 for determining a prioritized list of telephone numbers for a specific user is depicted. The system 10 includes one or more vehicles 12, 12' associated with the specific user, a server 14 (which may be part of a center 16 that provides back-end services to the vehicles 12, 12'), and a carrier/communication system 18.

Phone calls and/or messages (e.g., downloaded profiles, etc.) may be transmitted to, from, and/or between communication component(s) of the vehicle(s) 12, 12' and the center 16 using the carrier/communication system 18. Some of the communication links between the various components are shown as lightning bolts and arrows in FIG. 1.

In an example, the carrier/communication system 18 is a two-way radio frequency (RF) communication system. The carrier/communication system 18 may include one or more cell towers 20 or satellites (not shown). It is to be understood that the carrier/communication system 18 may also include one or more base stations and/or mobile switching centers (MSCs) 22 (e.g., for a 2G/3G network), one or more evolved Node Bs (eNodeB) and evolved packet cores (EPC) 24 (for a 4G (LTE) network), and/or one or more land networks 26. The carrier/communication system 18 may be part of a cellular radio environment or a satellite radio environment, which may include a variety of wireless network providers (which include mobile network operator(s), not shown), utilizing the same or a variety of radio access technologies. While several examples have been provided, it is to be understood that the architecture of the wireless carrier/communication system 18 may be GSM (global system for mobile telecommunications), CDMA2000, UMTS (universal mobile telecommunications system), LTE (long-term evolution), or some other available architecture.

An Internet connection may also be utilized for the transmission of the message(s), data, etc. The transmission of the messages, data, etc. may be made using the carrier/communication system 18, either through the vehicle's Internet connection (e.g., when the vehicle 12, 12' is equipped with a 4G long-term evolution, LTE, or other suitable Internet connection) or through a mobile device's cellular and Internet connection (when the mobile device is present in the vehicle 12, 12' and is in wireless communication with the vehicle 12, 12').

The vehicle 12, 12' may be a car, motorcycle, truck, or recreational vehicle (RV) that is associated with the specific user. A vehicle 12, 12' is considered to be associated with the specific user when the specific user can be recognized or identified upon entering the vehicle 12, 12'. In some examples, the vehicle 12, 12' includes some recognition system that can identify the specific user. In an example, the specific user can be recognized through his/her mobile device. When the specific user enters any vehicle 12, 12', his/her mobile device may wirelessly connect (via any short range wireless technology) to a vehicle communications platform (VCP) 28 of the vehicle 12, 12'. The VCP 28 may have the mobile device identifier (e.g., phone number, serial number, etc.) stored in a memory 44 thereof, and may retrieve the user that is linked to the mobile device identifier in the memory 44. When multiple mobile devices are recognized by the VCP 28, the VCP 28 may prompt the in-vehicle occupants to identify which of the identified occupants is the driver. For example, a voice prompt or a display prompt may indicate which potential drivers have been recognized by their mobile devices, and request that the in-vehicle occupants select one of the potential drivers who will be driving this trip. Alternatively, the VCP 28 may use data from a peripheral device (e.g., a camera, a fingerprint pad, a retinal scanner, or another biometric device) to identify who is in the driver's seat.

In other examples, the vehicle 12, 12' uses an off-board recognition system that can identify the specific user. For example, the VCP 28 may alternatively transmit the mobile device identifier of the recognized mobile device to the server 14, which uses the information to identify the specific user. When multiple mobile device identifiers are recognized, the VCP 28 may also transmit data from a peripheral device (e.g., a camera, a fingerprint pad, a retinal scanner, or another biometric device) indicating who the driver is to the server 14. In this example, the identity of the specific user is then determined by the server 14, and is transmitted to the VCP 28 from the server 14, so the vehicle 12, 12' knows who the specific user is.

The vehicle 12, 12' may be owned by the specific user, or the specific user may be an authorized user of the vehicle 12, 12', or the specific user may be previously unaffiliated with the vehicle (e.g., a fleet vehicle, rental vehicle, or borrowed vehicle, etc.), as long as the vehicle 12, 12' has the capability of identifying the specific user using the server 14.

The vehicles 12, 12' are equipped with suitable hardware and computer readable instructions/code that enable it to communicate (e.g., transmit and/or receive voice and data communications) over the carrier/communication system 18 (e.g., with the server 14). In some instances, the vehicle(s) 12, 12' are also capable of communicating using a short range wireless communication link. The components of vehicle 12 will be described in more detail, although it is to be understood that each of the other vehicles 12' may be equipped with the same or similar components.

As shown in FIG. 1, the vehicle 12 includes the previously mentioned vehicle communication/communications platform (VCP) 28. In an example, the VCP 28 is an on-board vehicle dedicated communications and entertainment device. In another example (not shown), the VCP 28 is an on-board vehicle dedicated communications device (e.g., a telematics unit), and the vehicle 12 includes a separate on-board vehicle dedicated entertainment device (e.g., an infotainment unit). Whether integrated into a single unit (e.g., VCP 28) or included as separate units, the on-board vehicle dedicated communications and entertainment device(s) include hardware components that are capable of running computer readable instructions/code, which are embodied on non-transitory, tangible computer readable media.

The VCP 28 may provide a variety of services, both individually and through its communication with the center 16 (e.g., which may be a facility that is owned and operated by an in-vehicle infotainment unit service provider). Several examples of these services include, but are not limited to: turn-by-turn directions and other navigation-related services provided in conjunction with a location detection module 30; airbag deployment notification and other emergency or roadside assistance-related services provided in connection with various sensor interface modules and sensors located throughout the vehicle 12; and infotainment-related services where music, Web pages, movies, television programs, videogames and/or other content is downloaded by the VCP 28 via a vehicle bus system 32 and an audio bus system (not shown). The listed services are by no means an exhaustive list of all the capabilities of the VCP 28, but are simply an illustration of some of the services that the VCP 28 is capable of offering.

The vehicle bus system 32 may utilize a variety of networking protocols, such as a controller area network (CAN), a media oriented system transfer (MOST), a local interconnection network (LIN), an Ethernet, TCP/IP, and other appropriate connections such as those that conform with known ISO, SAE, and IEEE standards and specifications, to name a few. The vehicle bus system 32 enables the vehicle 12 to send signals (e.g., real-time bus messages, etc.) from the VCP 28 to various units of equipment and systems (e.g., display 48 and speakers 50). The vehicle bus system 32 also enables the vehicle 12 to receive signals at the VCP 28 from various units of equipment and systems (e.g., vehicle sensors (not shown)). An example of a signal received by the vehicle bus 32 includes a historical calling profile received by the server 14. An example of a signal transmitted by the vehicle bus 32 includes a most recently generated list of telephone numbers to be displayed by the display 48.

As noted above, the VCP 28 may be used for vehicle communications. Some vehicle communications (e.g., between the vehicle 12 and the server 14 at the center 16) utilize radio or satellite transmissions to establish a voice channel with the carrier/communication system 18 such that both voice and data transmissions may be sent and received over the voice channel. In some instances, vehicle communications are enabled through the VCP 28 via a communications module 34, which includes a cellular chipset/component 36 for voice communications and a data transmission system 38 for data transmission.

The cellular chipset/component 36 of the VCP 28 may be an analog, digital, dual-mode, dual-band, multi-mode and/or multi-band wireless transceiver. The cellular chipset-component 36 uses one or more prescribed frequencies in standard analog and/or digital bands in the current market for cellular systems. Any suitable protocol may be used, including digital transmission technologies, such as TDMA (time division multiple access), CDMA (code division multiple access), W-CDMA (wideband CDMA), FDMA (frequency-division multiple access), OFDMA (orthogonal frequency-division multiple access), etc.

In an example, the data transmission system 38 may include a packet builder, which is programmed to make decisions about what packet to send (e.g., bandwidth, data to include, etc.) and to actually build a packet data message. In another example, the data transmission system 38 may include a wireless modem, which applies some type of encoding or modulation to convert the digital data so that it can communicate through a vocoder or speech codec incorporated in the cellular chipset/component 36. It is to be understood that any suitable encoding or modulation technique that provides an acceptable data rate and bit error may be used with the examples disclosed herein. While examples have been provided, it is to be understood that any suitable data transmission system 38 may be used.

The VCP 28 may also be configured for short range wireless communication technologies, such as BLUETOOTH® and various classes thereof, dedicated short-range communications (DSRC), or WI-FI™ and various classes thereof.

The location detection unit 30 may include a GPS receiver, a radio triangulation system, a dead reckoning position system, and/or combinations thereof. In particular, a GPS receiver provides accurate time and latitude and longitude coordinates of the vehicle 12 responsive to a GPS broadcast signal received from a GPS satellite constellation (not shown). The location detection unit 30 may also include, for example, Glonass (i.e., global navigation satellite system), Sbas (i.e., satellite-based augmentation systems), or a D-GPS (differential global positioning system). The location detection chipset/component 30 may or may not be part of an in-vehicle navigation unit.

The VCP 28 may also include a real-time clock (RTC) 40. The real-time clock (RTC) 40 provides accurate date and time information to the VCP 28 hardware and software components that may require and/or request date and time information. In an example, the RTC 40 may provide time and/or date information for any outgoing call made from the vehicle 12.

The VCP 28 also includes an electronic processing device 42 operatively coupled to one or more types of electronic memory 44. In an example, the electronic processing device 42 is a microprocessor. In other examples, the electronic processing device 42 may be a micro controller, a controller, and/or a host processor. In another example, electronic processing device 42 may be an application specific integrated circuit (ASIC). The electronic memory 44 of the VCP 28 may be an encrypted memory that is configured to store i) a call log application 46 to be executed by the processor 42, ii) data associated with the various systems of the vehicle 12 (i.e., vehicle data, VIN, etc.), and the like. The electronic memory 44 may be a non-transitory, tangible computer readable media (e.g., RAM).

In the examples disclosed herein, the call log application 46 may automatically launch in response to the specific user being identified in the vehicle 12 or 12'. The call log application 46 collects data related to outgoing calls made from the vehicle 12, 12' while the user is in the vehicle 12 in order to build up a historical calling profile for the specific user. The call log application 46 also uses the historical calling profile to determine the prioritized list of telephone numbers for the specific user while the user is in the vehicle 12 or 12'. The call log application 46 in each of the vehicles 12, 12' is in communication with the server 14, and thus receives information that is specific to the user that is then-currently recognized in the vehicle 12, 12', and can also adapt its output based upon the specific user.

Once launched, the call log application 46 is programmed to monitor outgoing calling activity from the vehicle 12 or 12' (i.e., calls made using the VCP 28). The call log application monitors the outgoing calling activity every second while the specific user is in the vehicle 12 or 12'. When the user makes an outgoing call from the VCP 28, the call log application 46 recognizes that the call is being made and collects data associated with the particular outgoing call.

For each outgoing call, the call log application 46 collects the location of the vehicle 12 or 12' during at least a portion of the outgoing call (i.e., a vehicle location data point), the time/date of the outgoing call (i.e., a time/date data point), and a subject telephone number of the outgoing call (i.e., what number is being/has been called).

The vehicle location data point may be received at the call log application 46 from the location detection unit 30. The vehicle location data point(s) may include a latitude data point of the vehicle 12, 12', a longitude data point of the vehicle 12, 12', an elevation data point of the vehicle 12, 12', or combinations thereof. The location detection unit 30 may include an admissible error value for the computation of the location data point. The vehicle location data point may be received/collected several times during a single outgoing call. It may be desirable to receive/collect multiple vehicle location data points during a single outgoing call because the vehicle 12, 12' may be moving while the call is in progress. In an example, the vehicle location data point may be received by the location detection unit 30 each second of the outgoing call for a duration ranging from 5 seconds to 30 seconds. In this example, the call log application 46 receives from 5 vehicle location data points (e.g., if one location data point is received per second for 5 seconds) to 90 vehicle location data points (e.g., if three location data points are received per second for 30 seconds) for the one outgoing call. Collecting multiple location data points for one outgoing call helps to improve the accuracy of the predictions that are subsequently made by the call log application 46. It is to be understood that the vehicle location data points may be collected at any 5 second to 30 second period of the outgoing call (e.g., at seconds 1 through 5, seconds 5 through 35, etc.). If the call ends before the data collection is complete (e.g., before 30 seconds), any data that is collected will be utilized.

The time/date data point may be received from the real-time clock (RTC) 40. The time/date data point may include a calendar day on which the outgoing call is made and/or a time of the day at which the outgoing call is made. The time of the day may be the hour (e.g., 1-24), or the minute and the hour, or the second, the minute, and the hour. If several vehicle location data points are collected, corresponding time/date data points may also be collected.

The data may be collected until the duration ends and/or until the outgoing call is complete, whichever occurs first.

After the data for the single outgoing call is collected, the call log application 46 generates a vehicle call record for the outgoing call. The vehicle call record includes the data points (i.e., location and time/date data points) and the subject phone number. The vehicle call record also identifies the specific user. This enables the server 14 to update the historical calling profile of the specific user. The server 14 will be described in more detail below.

It is to be understood that the call log application 46 will collect data and generate a vehicle call record for each outgoing call that is made while the specific user is in the vehicle 12, 12'. In a single trip (i.e., from vehicle on to vehicle off), any number of outgoing calls and corresponding vehicle call records may be made and generated.

The call log application 46 transmits the vehicle call record(s) to the server 14 for storage in the specific user's historical calling profile. To transmit the vehicle call record(s), the call log application 46 utilizes the VCP's communications module 34. During a vehicle data upload event, the communications module 34 transmits the vehicle call record(s) as packet data to the server 14. The vehicle call record may be transmitted immediately after it is generated, or all vehicle call record(s) during a single driving event may be transmitted together at the end of the event (as signaled by the vehicle engine being powered down, turned off, etc.).

Any later time the specific user enters the vehicle 12 or another vehicle 12' that is capable of recognizing him/her and is equipped with the call log application 46, the respective call log application 46 collects data for each instance of an outgoing call made while the specific user is in the vehicle 12, 12', and generates a corresponding vehicle call record. As such, the user's historical calling profile is regularly updated, regardless of which vehicle 12, 12' he/she is using. The function of updating the historical calling profile may be performed simultaneously (e.g., in the background) with other functions that are performed by the call log application 46.

The call log application 46 is also capable of using the historical calling profile of the specific user to generate a prioritized list of telephone numbers for the specific user.

When the user is identified in the vehicle 12, 12' (as previously described herein) and the call log application 46 launches in response, the historical calling profile for the specific user is automatically downloaded to the call log application 46. When the VCP 28 identifies the specific user, the server 14 may automatically download the historical calling profile in response to a request from the VCP 28. The request may include the identity of the specific user. When the server 14 identifies the specific user, the server 14 may transmit the historical calling profile to the call log application 46 along with the identity of the specific user.

In an example, the call log application 46 receives a request (e.g., via a user input at the user interface 52) from the user for the prioritized list. In another example, the call log application 46 may routinely update the prioritized list (e.g., at predetermined intervals) while the user is in the vehicle 12, 12'.

To generate the prioritized list of telephone numbers for the specific user, the call log application 46 dynamically determines a probability of a particular telephone number being chosen for an outgoing call within predetermined time increments while the specific user is in the vehicle 12 or 12'. The probability is dependent upon all of the data from the vehicle call record(s) in the historical calling profile. The probability, and thus the accuracy which is directly proportional to the probability, may be increased in the examples disclosed herein because the data taken into account includes the location of the vehicle 12, 12' when prior outgoing calls were made, as well as the date/time those calls were made. As mentioned above, the location data for any one vehicle call record may include up to 90 location data points (i.e., 3 different types of location data collected for 30 seconds of a call).

The call log application 46 retrieves data from call records data within a predetermined time frame (e.g., 2 weeks, 3 months, etc. prior to the current date). The predetermined time frame is a window period within which the historical calling data is considered suitable for modeling the behavior of the user. If the user frequently makes outgoing calls to the same number(s), the window period may be shorter than if the user rarely makes outgoing calls. The call log application 46 may automatically update the window period based upon the specific user's historical calling profile. Additionally, any data outside this window period is considered stale and is not retrieved for use by the call log application 46. The call log application 46 may also flag any stale vehicle calling records, and the server 14 may discard these particular records from the specific user's historical calling profile.

Generally, the call log application 46 associates probabilities to candidate calling contacts (as determined by the specific user's historical calling profile) at a requested time, or according to a predetermined schedule while the user is in the vehicle.

More specifically, the call log application 46 utilizes the retrieved data as training data for a machine learning algorithm and for building a prediction model. The prediction model is a product of the machine learning algorithm on the given data. The machine learning algorithm does not utilize any forward looking data to build the prediction model and make the prediction. In an example, the machine learning algorithm is C4.5 or J48 (i.e., open source Java implementation of the C4.5 algorithm), each of which builds decision trees from the training data. Other suitable machine learning algorithms include Random forest, Hoeffding tree, modified Naïve-Bayes, and the like. With the decision trees, the machine learning algorithm, and the prediction model built therefrom, can classify an unknown instance (i.e., predict the probability of a telephone number being selected for an outgoing call at a given time while the user is in the vehicle 12, 12'). The output of the prediction model is a prediction classifier. In the examples disclosed herein, the prediction classifier is a prioritized list of predicted telephone number(s) that is/are likely to be called at a particular instance while the specific user is in the vehicle 12, 12'.

In an example, a probability is generated for each telephone number in the data that is analyzed from the historical calling profile. A predetermined number (e.g., from 1 to 5 or 1 to 10) of the probable telephone numbers may be included in the list. As such, each telephone number in the list is associated with a probability of that particular number being selected for an outgoing call. The telephone numbers are sorted by the probability, with the highest probability numbers being at the top of the list. The list may also include the error distribution for each predicted telephone number.

The call log application 46 may dynamically determine the probability of a particular telephone number being chosen for an outgoing call within predetermined time increments. As such, at the end of one predetermined time increment, the call log application 46 retrieves data from the historical calling profile (which may have been recently updated if the user has made an outgoing call from the vehicle 12, 12'), and runs the prediction model to update the prioritized list of predicted telephone number(s) for the next predetermined time increment. This process is repeated for each predetermined time increment that the specific user is in the vehicle 12, 12'. In an example, the predetermined time increment is every minute that the specific user is in the vehicle 12, 12'. In this example, the prioritized list of predicted telephone number(s) will be updated every minute. In another example, the predetermined time increment is every 7 seconds that the specific user is in the vehicle 12, 12'.

Rather than routinely updating the prioritized list or at some point in between routine updates, the call log application 46 may dynamically determine the probability of a particular telephone number being chosen for an outgoing call upon receiving a request from an in-vehicle occupant.

Figure 2:
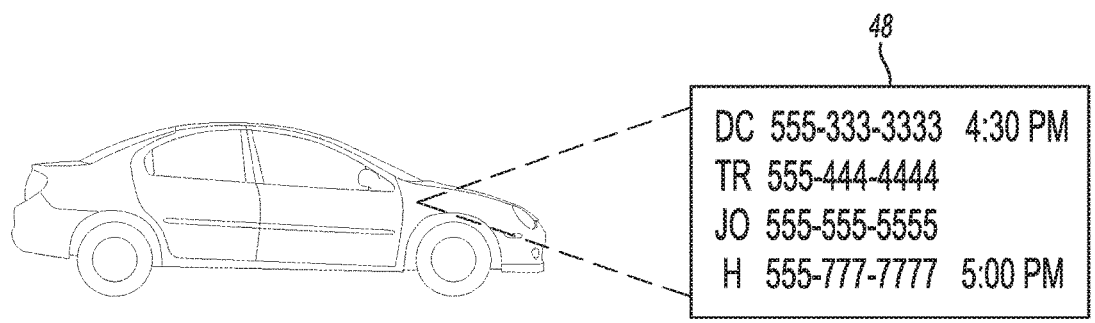
FIG. 2 is a schematic view of an in-vehicle display displaying a most recently generated list of telephone numbers sorted by a dynamically determined probability.

The call log application 46 commands the display 48 to display the telephone number(s) with the highest probability. Generally, from 1 to 10 telephone number(s) are displayed, and the telephone number(s) that are displayed have at least a 10% probability of being selected for an outgoing call within the predetermined time increment. The probability for each telephone number is independent of the probabilities for each other telephone number. The display 48 may depict the telephone number(s), any name associated with the particular number(s), and the predicted time that the number is likely to be selected for an outgoing call. An example of this is shown in FIG. 2, where the telephone number for the daycare (DC) is most likely to be selected as an outgoing call at 4:30 pm, followed by the telephone number for the thai restaurant (TR), and the telephone number for J's office (JO), and the telephone number for home (H) is most likely to be selected as an outgoing call at 5:00 pm. These numbers have the highest probability of being selected for an outgoing call at the given time and at the vehicle's then-current location, where the probability is based upon historical calling data of the specific user.

Because, in some examples, the prioritized list is updated for every time increment while the user is in the vehicle 12, 12', the display 48 may be constantly changing. However, if the prioritized list does not change from one time increment to the next, the display 48 will maintain the previously displayed list of telephone number(s), but may update the predicted time at which the number is likely to be selected. In other examples, the prioritized list is updated in response to a user request, and thus will be updated when the request is received and processed.

In an example, the display 48 is a full-color touch screen display. Other examples of the display 48 include a VFD (Vacuum Fluorescent Display), an LED (Light Emitting Diode) display, an LCD (Liquid Crystal Diode) display, and/or the like. In an example, the speaker 50 is a speaker of the user interface 52 as shown in FIG. 1. In other examples, the speaker 50 may be a standalone speaker or a vehicle speaker (not shown).

The display 48 may be part of a user interface 52. The user interface 52 is operatively connected to the vehicle bus system 32. The user interface 52 allows the specific user to input information and commands to the vehicle 12 (e.g., the call log application 46) and receive information from the vehicle 12 (e.g., the prioritized list from the call log application 46). The user interface 52 may be any command-driven user interface or any menu-driven interface. In an example, the user interface 52 is a graphical user interface (GUI). In another example, the user interface 48 is a human machine interface (HMI). As shown in FIG. 1, in addition to the display 48, the user interface 48 may also include the speaker 50. The user interface 52 may also include a microphone (not shown).

The user interface 52 may assist the VCP 28 with a variety of services. One example of these services includes the user interface 52 allowing the specific user to select a call from the displayed most recently generated list of telephone numbers. As examples, the specific user may tap the displayed telephone number or name associated therewith that he/she would like to dial at the user interface 52. The telephone number is then transmitted to the cellular chipset/component 36 of the VCP 28, which initiates dialing of the user selected telephone number.

The system 10 also includes the previously mentioned server 14. As shown in FIG. 1, the server 14 may be located at the center 16 that provides back-end services to the vehicles 12, 12'. The server 14 may be a dedicated server that participates in servicing the call log application 46. For example, the server 14 assists in determining the prioritized list of telephone numbers for the specific user by storing the most up-to-date historical calling profile and supplying the historical calling profile to the vehicle 12, 12' that the specific user is then-currently located in.

Upon receiving a vehicle call record, the server 14 matches the call record with a profile of the specific user, and updates the historical calling profile of the specific user with the call record. The server 14 is also programmed to delete any stale call records (i.e., outdated records that are no longer useful for the machine learning algorithm and prediction model).

Upon receiving a request, the server 14 is programmed to respond to the request either by identifying the specific user (through the mobile device identifier received in the request) and retrieving the specific user's historical calling profile, or by retrieving the historical calling profile of the specific user identified in the request.

The server 14 is a system of computer hardware (e.g., central processing unit 54) and computer readable instructions that is capable of receiving and storing the vehicle call record(s) and that is capable of responding to requests received from the call log application 46. The central processing unit 54 may be a controller, a host processor, or an ASIC. The central processing unit 54 is capable of executing the computer readable instructions of a call log service program stored on an electronic memory 56 of the central server 14.

The server 14 may receive vehicle calling record(s) and/or requests from the vehicle 12, 12' and/or transmit data (e.g., the specific user's historical calling profile) through the carrier/communication system 18. More specifically, the server 14 also includes a server communication transceiver 58 that is in selective communication with the VCP 28. The server communication transceiver 58 may be any suitable data transmission system that is capable of sending and/or receiving data communications over the carrier/communication system 18. For example, the server communication transceiver 58 is capable of receiving the vehicle call record(s) and the request(s) from the call log application 46 (and the VCP 28), and is capable of transmitting the specific user's historical calling log (alone or in combination with the specific user's identify) back to the call log application 46.

In addition to the server 14, the center 16 may also include other components, such as additional computing equipment 60, switch(es) 62, advisor(s) (not shown), database(s) 64, and a network connection or bus 68.

The center computing equipment 60, which is often used in conjunction with telecommunication equipment (not shown), is generally equipped with suitable hardware and software and/or programs enabling the hardware of the computing equipment 60 to accomplish a variety of center functions. The computing equipment 60 may be programmed to carry out some of the tasks/operations of the center 16. The telecommunication and computing equipment 60 may include a network of servers (including server 14) coupled to both locally stored and remote databases (e.g., database 64) of any information processed.

The center 16 may also include switch(es) 62. The switch 62 may be a private branch exchange (PBX) switch. The switch 62 routes incoming signals so that voice transmissions are usually sent to either a live advisor or the automated response system, and data transmissions are passed on to a modem or other piece of equipment (e.g., a communications module) for demodulation and further signal processing. The modem may include an encoder, and may be connected to various devices such as the server 14 and database 64.

The center 16 also includes live and/or automated advisors (not shown). Each advisor may be associated with a workstation, including telecommunication and computing equipment 60.

The database(s) 64 at the center 16 may be designed to store vehicle record(s), subscriber/user profile records (including the historical calling profile), or any other pertinent subscriber and/or vehicle information and/or mobile device information. In an example, the database(s) 64 may be configured to store the user profile, which may contain personal information of the subscriber/user 14 (e.g., the subscriber's name, garage/home address, billing address, home phone number, cellular phone number/mobile dialing number, etc.), his/her historical calling profile, etc. The server 14 may utilize the information in the database to determine which specific user the call log application 46 is trying to identify, and/or which historical calling profile is associated with the identified specific user.

It is to be understood that the databases 64 may allow the center 16 to function as a repository for data collected from the vehicle 12, 12'. In some instances, another facility may function as a repository for the collected data (e.g., a customer relationship management system (not shown) associated with the center 16 whose database(s) the server 14 or advisors can access).

As illustrated in FIG. 1, the various call center components are coupled to one another via a network connection or bus 68, which may be similar to the vehicle bus 32 previously described.

It is to be appreciated that the center 16 may be any central or remote facility, manned or unmanned, mobile or fixed, to or from which it is desirable to exchange voice and data communications. As such, the live advisor may be physically present at the center 16 or may be located remote from the center 16 while communicating therethrough.

The center 16 shown in FIG. 1 may also be virtualized and configured in a Cloud Computer, that is, in an Internet-based computing environment. For example, the computer equipment 60 may be accessed as a Cloud platform service, or PaaS (Platform as a Service), utilizing Cloud infrastructure rather than hosting computer equipment 60 at the center 16.

The database 64 and server 14 may also be virtualized as a Cloud resource. The Cloud infrastructure, known as IaaS (Infrastructure as a Service), typically utilizes a platform virtualization environment as a service, which may include components such as the computing equipment 60, database 64, server 14, and other computer equipment. In an example, the determination as to the identity of the specific user and/or the retrieval of the historical calling profile disclosed herein may be performed in the Cloud via the SaaS (Software as a Service).

To further illustrate the present disclosure, examples are given herein. It is to be understood that these examples are provided for illustrative purposes and are not to be construed as limiting the scope of the present disclosure.

EXAMPLES

Examples 1-4 illustrate the difference in the prediction accuracy when 7 attributes are utilized (including various location data points), and when different combinations of less than 7 attributes are utilized. These examples illustrate that the prediction accuracy improves significantly when location data point attribute are utilized, and more particularly when 7 attributes—GPS latitude, GPS longitude, elevation, month, day, hour, outgoing call number—are utilized as the training data for the prediction.

Example 1

The following prediction accuracy results were performed with all 7 attributes according to 10-fold cross validation, indicated in Confusion Matrix 1 below.

Tenfold cross-validation: The data was divided randomly into 10 parts in which the class was represented in approximately the same proportions as in the full dataset and the learning scheme trained on the remaining nine-tenths. The learning procedure was executed a total of 10 times on different training sets.

Confusion Matrix: In multiclass prediction, the result on a test set may be displayed as a row and column for each class. Each matrix element shows the number of test examples, in which the actual class is the row and the predicted class is the column. Good results correspond to large numbers down the main diagonal and small, ideally zero, off-diagonal elements.

=== Confusion Matrix ===

Confusion Matrix 1

| a | b | c | d | e | f | g | h | i | j | k | l | m | <-- classified as |
|---|---|---|---|---|---|---|---|---|---|---|---|---|---|
| 557 | 3 | 1 | 2 | 0 | 0 | 0 | 0 | 0 | 0 | 0 | 0 | 0 | a = XXXXXX0071 |
| 0 | 1073 | 0 | 0 | 0 | 0 | 0 | 0 | 0 | 0 | 0 | 0 | 0 | b = XXXXXX1496 |
| 0 | 0 | 424 | 0 | 0 | 0 | 0 | 0 | 0 | 0 | 0 | 0 | 0 | c = XXXXXX8310 |
| 0 | 0 | 0 | 82 | 0 | 0 | 0 | 0 | 0 | 0 | 0 | 0 | 0 | d = XXXXXX5893 |
| 0 | 0 | 0 | 0 | 30 | 0 | 0 | 0 | 0 | 0 | 0 | 0 | 0 | e = XXXXXX1236 |
| 0 | 0 | 0 | 0 | 0 | 30 | 0 | 0 | 0 | 0 | 0 | 0 | 0 | f = XXXXXX7203 |
| 0 | 1 | 0 | 0 | 0 | 0 | 29 | 0 | 0 | 0 | 0 | 0 | 0 | g = XXXXXX4840 |
| 0 | 0 | 0 | 0 | 0 | 0 | 0 | 30 | 0 | 0 | 0 | 0 | 0 | h = XXXXXX6496 |
| 0 | 0 | 0 | 0 | 0 | 0 | 0 | 0 | 5 | 0 | 0 | 0 | 0 | i = XXXXXX0071 |
| 0 | 1 | 0 | 0 | 0 | 0 | 0 | 0 | 0 | 14 | 0 | 0 | 1 | j = XXXXXX9480 |
| 0 | 0 | 0 | 0 | 0 | 0 | 0 | 0 | 0 | 0 | 30 | 0 | 0 | k = XXXXXX3880 |
| 0 | 0 | 0 | 0 | 0 | 0 | 0 | 0 | 0 | 0 | 0 | 18 | 0 | l = XXXXXX7822 |
| 0 | 0 | 0 | 0 | 0 | 0 | 0 | 0 | 0 | 0 | 0 | 0 | 31 | m = XXXXXX0352 |

As illustrated in confusion matrix 1, when the 7 attributes were utilized, there were 2353 correctly classified instances (99.619%), and 9 incorrectly classified instances (0.381%).

Example 2

The following prediction accuracy results were performed with 4 attributes—GPS latitude, GPS longitude, hour, outgoing call number—according to 10-fold cross validation, indicated in Confusion Matrix 2 below.

=== Confusion Matrix ===

Confusion Matrix 2

| a | b | c | d | e | f | g | h | i | j | k | l | m | <-- classified as |
|---|---|---|---|---|---|---|---|---|---|---|---|---|---|
| 527 | 34 | 1 | 0 | 0 | 0 | 0 | 0 | 0 | 1 | 0 | 0 | 0 | a = XXXXXX0071 |
| 29 | 1040 | 3 | 0 | 0 | 0 | 1 | 0 | 0 | 0 | 0 | 0 | 0 | b = XXXXXX1496 |
| 0 | 2 | 417 | 5 | 0 | 0 | 0 | 0 | 0 | 0 | 0 | 0 | 0 | c = XXXXXX8310 |
| 0 | 0 | 0 | 82 | 0 | 0 | 0 | 0 | 0 | 0 | 0 | 0 | 0 | d = XXXXXX5893 |
| 0 | 0 | 0 | 0 | 30 | 0 | 0 | 0 | 0 | 0 | 0 | 0 | 0 | e = XXXXXX1236 |
| 0 | 0 | 0 | 0 | 0 | 30 | 0 | 0 | 0 | 0 | 0 | 0 | 0 | f = XXXXXX7203 |
| 0 | 1 | 0 | 0 | 0 | 0 | 29 | 0 | 0 | 0 | 0 | 0 | 0 | g = XXXXXX4840 |
| 0 | 0 | 0 | 0 | 0 | 0 | 0 | 30 | 0 | 0 | 0 | 0 | 0 | h = XXXXXX6496 |
| 0 | 0 | 0 | 0 | 0 | 0 | 0 | 0 | 5 | 0 | 0 | 0 | 0 | i = XXXXXX0071 |
| 0 | 1 | 0 | 0 | 0 | 0 | 0 | 0 | 0 | 14 | 0 | 0 | 1 | j = XXXXXX9480 |
| 0 | 0 | 0 | 0 | 0 | 0 | 0 | 0 | 0 | 0 | 30 | 0 | 0 | k = XXXXXX3880 |
| 0 | 0 | 0 | 0 | 0 | 0 | 0 | 0 | 0 | 0 | 0 | 18 | 0 | l = XXXXXX7822 |
| 0 | 0 | 0 | 0 | 0 | 0 | 0 | 0 | 0 | 0 | 0 | 0 | 31 | m = XXXXXX0352 |

As illustrated in confusion matrix 2, when only 4 attributes were utilized, there were 2283 correctly classified instances (96.6554%), and 79 incorrectly classified instances (3.3446%).

Example 3

The following prediction accuracy results were performed with 4 attributes—month, day, hour, outgoing call number—according to 10-fold cross validation, indicated in Confusion Matrix 3 below.

As illustrated in confusion matrix 3, when 4, non-location data point attributes were utilized, there were 1684 correctly classified instances (71.2955%), and 678 incorrectly classified instances (28.7045%). In comparing the results from Examples 2 and 3, it is clear that the location data points (used in Example 2 and not used in Example 3) significantly improve the accuracy of the predictions.

Example 4

The following prediction accuracy results were performed with 4 attributes—GPS latitude, GPS longitude, elevation, outgoing call number—according to 10-fold cross validation, indicated in Confusion Matrix 3 below.

=== Confusion Matrix ===

Confusion Matrix 3

| a | b | c | d | e | f | g | h | i | j | k | l | m | <-- classified as |
|---|---|---|---|---|---|---|---|---|---|---|---|---|---|
| 370 | 160 | 25 | 2 | 0 | 0 | 0 | 0 | 0 | 0 | 0 | 0 | 0 | a = XXXXXX0071 |
| 172 | 791 | 91 | 0 | 0 | 0 | 19 | 0 | 0 | 0 | 0 | 0 | 0 | b = XXXXXX1496 |
| 25 | 51 | 309 | 0 | 0 | 17 | 0 | 0 | 0 | 0 | 1 | 0 | 21 | c = XXXXXX8310 |
| 0 | 0 | 0 | 82 | 0 | 0 | 0 | 0 | 0 | 0 | 0 | 0 | 0 | d = XXXXXX5893 |
| 0 | 0 | 0 | 0 | 30 | 0 | 0 | 0 | 0 | 0 | 0 | 0 | 0 | e = XXXXXX1236 |
| 0 | 0 | 0 | 0 | 0 | 30 | 0 | 0 | 0 | 0 | 0 | 0 | 0 | f = XXXXXX7203 |
| 0 | 18 | 0 | 0 | 0 | 0 | 12 | 0 | 0 | 0 | 0 | 0 | 0 | g = XXXXXX4840 |
| 0 | 0 | 0 | 0 | 0 | 0 | 0 | 30 | 0 | 0 | 0 | 0 | 0 | h = XXXXXX6496 |
| 0 | 0 | 5 | 0 | 0 | 0 | 0 | 0 | 0 | 0 | 0 | 0 | 0 | i = XXXXXX0071 |
| 0 | 0 | 10 | 0 | 0 | 0 | 0 | 0 | 0 | 0 | 0 | 0 | 6 | j = XXXXXX9480 |
| 0 | 0 | 0 | 0 | 0 | 0 | 0 | 0 | 0 | 0 | 3 | 0 | 27 | k = XXXXXX3880 |
| 0 | 0 | 0 | 0 | 0 | 0 | 0 | 0 | 0 | 0 | 2 | 0 | 16 | l = XXXXXX7822 |
| 0 | 0 | 0 | 0 | 0 | 0 | 0 | 0 | 0 | 0 | 4 | 0 | 27 | m = XXXXXX0352 |

Confusion Matrix 4

Confusion Matrix 4

| a | b | c | d | e | f | g | h | i | j | k | l | m | <-- classified as |
|---|---|---|---|---|---|---|---|---|---|---|---|---|---|
| 519 | 43 | 1 | 0 | 0 | 0 | 0 | 0 | 0 | 0 | 0 | 0 | 0 | a = XXXXXX0071 |
| 36 | 1024 | 9 | 0 | 0 | 0 | 0 | 0 | 0 | 0 | 0 | 0 | 4 | b = XXXXXX1496 |
| 1 | 2 | 416 | 4 | 1 | 0 | 0 | 0 | 0 | 0 | 0 | 0 | 0 | c = XXXXXX8310 |
| 0 | 0 | 1 | 81 | 0 | 0 | 0 | 0 | 0 | 0 | 0 | 0 | 0 | d = XXXXXX5893 |
| 0 | 0 | 0 | 0 | 30 | 0 | 0 | 0 | 0 | 0 | 0 | 0 | 0 | e = XXXXXX1236 |
| 0 | 0 | 0 | 0 | 0 | 30 | 0 | 0 | 0 | 0 | 0 | 0 | 0 | f = XXXXXX7203 |
| 0 | 1 | 1 | 0 | 0 | 0 | 28 | 0 | 0 | 0 | 0 | 0 | 0 | g = XXXXXX4840 |
| 0 | 0 | 0 | 0 | 0 | 0 | 0 | 30 | 0 | 0 | 0 | 0 | 0 | h = XXXXXX6496 |
| 0 | 0 | 0 | 0 | 0 | 0 | 0 | 0 | 5 | 0 | 0 | 0 | 0 | i = XXXXXX0071 |
| 0 | 0 | 0 | 0 | 0 | 0 | 0 | 0 | 0 | 16 | 0 | 0 | 0 | j = XXXXXX9480 |
| 0 | 0 | 0 | 0 | 0 | 0 | 0 | 0 | 0 | 0 | 29 | 1 | 0 | k = XXXXXX3880 |
| 0 | 0 | 0 | 0 | 0 | 0 | 0 | 0 | 0 | 0 | 0 | 18 | 0 | l = XXXXXX7822 |
| 0 | 2 | 1 | 0 | 0 | 0 | 0 | 0 | 0 | 0 | 0 | 0 | 28 | m = XXXXXX0352 |

As illustrated in confusion matrix 4, when 3 location data point attributes were utilized, there were 2254 correctly classified instances (95.4276%), and 108 incorrectly classified instances (4.5724%).

In comparing the results from Examples 1-4, it is clear that the combination of the time of day and location data point attributes (Examples 1 and 2) provide the best combination for obtaining accurate predictions.

Example 5

In this example, two confusion matrices were generated. Confusion matrix 5 is the cross validation result on a test set of data in which one data point was collected for each call. Confusion matrix 6 is the cross validation result on a test set of data in which 5-30 location data points were collected for each call. For confusion matrix 5, the prediction accuracy was 33.1% for over 150 calls made. Good results correspond to numbers down the main diagonal. For confusion matrix 6, the prediction accuracy was 99.69% for only a few calls.

Confusion Matrix 5

| a | b | c | d | e | f | g | h | i | j | k | l | m | n | o | <--classified as |
|---|---|---|---|---|---|---|---|---|---|---|---|---|---|---|---|
| 0 | 22 | 2 | 1 | 0 | 0 | 0 | 0 | 1 | 0 | 0 | 0 | 0 | 0 | 0 | a = XXXXXX0071 |
| 0 | 44 | 5 | 0 | 0 | 0 | 0 | 0 | 3 | 0 | 0 | 0 | 0 | 0 | 0 | b = XXXXXX1496 |
| 0 | 22 | 2 | 1 | 0 | 0 | 0 | 0 | 0 | 0 | 0 | 0 | 0 | 0 | 0 | c = XXXXXX8310 |
| 0 | 10 | 2 | 1 | 0 | 0 | 0 | 0 | 1 | 0 | 0 | 0 | 0 | 0 | 0 | d = XXXXXX5893 |
| 0 | 1 | 0 | 0 | 0 | 0 | 0 | 0 | 0 | 0 | 0 | 0 | 0 | 0 | 0 | e = XXXXXX5177 |
| 0 | 1 | 1 | 0 | 0 | 0 | 0 | 0 | 0 | 0 | 0 | 0 | 0 | 0 | 0 | f = XXXXXX6413 |
| 0 | 6 | 1 | 0 | 0 | 0 | 0 | 0 | 0 | 0 | 0 | 0 | 0 | 0 | 0 | g = XXXXXX9480 |
| 0 | 1 | 0 | 0 | 0 | 0 | 0 | 0 | 0 | 0 | 0 | 0 | 0 | 0 | 0 | h = XXXXXX1236 |
| 0 | 1 | 0 | 1 | 0 | 0 | 0 | 0 | 0 | 0 | 0 | 0 | 0 | 0 | 0 | i = XXXXXX6496 |
| 0 | 8 | 1 | 1 | 0 | 0 | 0 | 0 | 2 | 0 | 0 | 0 | 0 | 0 | 0 | j = XXXXXX3768 |
| 0 | 0 | 0 | 1 | 0 | 0 | 0 | 0 | 0 | 0 | 0 | 0 | 0 | 0 | 0 | k = XXXXXX3295 |
| 0 | 0 | 0 | 0 | 0 | 0 | 0 | 0 | 1 | 0 | 0 | 0 | 0 | 0 | 0 | l = XXXXXX0838 |
| 0 | 0 | 0 | 0 | 0 | 0 | 0 | 0 | 1 | 0 | 0 | 0 | 0 | 0 | 0 | m = XXXXXX1661 |
| 0 | 2 | 0 | 0 | 0 | 0 | 0 | 0 | 0 | 0 | 0 | 0 | 0 | 0 | 0 | n = XXXXXX9603 |
| 0 | 1 | 0 | 0 | 0 | 0 | 0 | 0 | 0 | 0 | 0 | 0 | 0 | 0 | 0 | o = XXXXXX1140 |

Confusion Matrix 6

| a | b | c | d | e | f | g | <--classified as |
|---|---|---|---|---|---|---|---|
| 187 | 0 | 0 | 0 | 0 | 0 | 0 | a = XXXXXX0071 |
| 1 | 525 | 2 | 0 | 0 | 0 | 0 | b = XXXXXX1496 |
| 0 | 0 | 157 | 0 | 0 | 0 | 0 | c = XXXXXX8310 |
| 0 | 0 | 0 | 52 | 0 | 0 | 0 | d = XXXXXX5893 |
| 0 | 0 | 0 | 0 | 30 | 0 | 0 | e = XXXXXX1236 |
| 0 | 0 | 0 | 0 | 0 | 30 | 0 | f = XXXXXX7203 |
| 0 | 0 | 0 | 0 | 0 | 0 | 30 | g = XXXXXX4840 |

It is to be understood that the term "communication" as used herein is to be construed to include all forms of communication, including direct and indirect communication. Indirect communication may include communication between two components with additional component(s) located therebetween.

Further, the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from 5 seconds to 30 seconds should be interpreted to include the explicitly recited limits of from 5 seconds to 30 seconds, as well as individual values, such as 6 seconds, 15 seconds, 23 seconds, etc., and sub-ranges, such as from about 8 seconds to about 25 seconds, from about 10 seconds to about 40 seconds, etc.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A method for determining a prioritized list of telephone numbers for a specific user, the method comprising:
    in response to identifying the specific user in a vehicle, automatically launching a call log application in the vehicle;
    upon launching the call log application, automatically downloading a historical calling profile for the specific user, the historical calling profile including individual vehicle call records;
    updating the historical calling profile with a vehicle call record corresponding to each instance of an outgoing call placed while the specific user is in the vehicle;
    dynamically determining a probability of a telephone number being chosen for an outgoing call within respective predetermined time increments while the specific user is in the vehicle or in response to a user request, the probability being dependent upon location data points retrieved from the individual vehicle call records;
    dynamically generating a list of telephone numbers sorted by the probability; and
    causing a most recently generated list of telephone numbers sorted by the probability to be displayed on a vehicle display while the specific user is in the vehicle.

2. The method as defined in claim 1 wherein:
    each of the individual vehicle call records consists of i) at least one of the location data points, wherein the at least one of the location data points represents a location of a calling vehicle from which a prior outgoing call was made, ii) month, day, and hour data points at which the prior outgoing call was made, and iii) a subject phone number of the prior outgoing call; and
    the probability is also dependent upon ii and iii.

3. The method as defined in claim 2 wherein the at least one of the location data points is selected from the group consisting of a latitude data point of the calling vehicle, a longitude data point of the calling vehicle, an elevation data point of the calling vehicle, and combinations thereof.

4. The method as defined in claim 1 wherein prior to dynamically determining the probability, the method further comprises retrieving respective location data points from each of the individual vehicle call records, wherein the respective location data points from each of the individual vehicle call records includes from 5 to 30 of the location data points collected at individual seconds during a duration of a prior outgoing call associated with the individual vehicle call record.

5. The method as defined in claim 4 wherein each of the 5 to 30 location data points is selected from the group consisting of a latitude data point for a calling vehicle from which the prior outgoing call was made, a longitude data point for the calling vehicle, an elevation data point for the calling vehicle, and combinations thereof.

6. The method as defined in claim 1 wherein the dynamically determining of the probability and the dynamically generating of the list includes:
    determining a first probability of the telephone number being chosen for the outgoing call within a first of the respective predetermined time increments;
    in response to the first probability, dynamically generating a first list of telephone numbers sorted by the first probability;
    while the specific user is in the vehicle, determining a second probability of the telephone number being chosen for the outgoing call within a next of the respective predetermined time increments upon an expiration of the first of the respective predetermined time increments; and
    in response to the second probability, dynamically generating a second list of telephone numbers sorted by the second probability.

7. The method as defined in claim 1, further comprising:
    generating the probability of each telephone number in the historical calling profile being chosen for an outgoing call; and
    incorporating from 1 telephone number to 5 telephone numbers in the most recently generated list.

8. A system for determining a prioritized list of telephone numbers for a specific user, the system comprising:
    a server; and
    a vehicle that is remote from the server, the vehicle including:
        a recognition system to recognize the specific user;
        a display;
        a vehicle communications platform including a microprocessor and a memory; and
        a call log application stored on the memory and executed by the microprocessor to:
            automatically launch in response to the recognition system identifying the specific user;
            automatically download, from the server, a historical calling profile for the specific user, the historical calling profile including individual vehicle call records;
            update the historical calling profile with a vehicle call record corresponding to each instance of an outgoing call placed while the specific user is in the vehicle;
            dynamically determine a probability of a telephone number being chosen for an outgoing call within respective predetermined time increments while the specific user in in the vehicle or in response to a user request while the specific user is in the vehicle, the probability being dependent upon location data points retrieved from the individual vehicle call records;
            dynamically generate a list of telephone numbers sorted by the probability; and
            cause a most recently generated list of telephone numbers sorted by the probability to be displayed on the display while the specific user is in the vehicle.

* * * * *